US011876338B2

(12) United States Patent
Ludewigt

(10) Patent No.: US 11,876,338 B2
(45) Date of Patent: Jan. 16, 2024

(54) DEVICE FOR COMBINING AT LEAST TWO LASER BEAMS

(71) Applicant: Rheinmetall Waffe Munition GmbH, Suedheide (DE)

(72) Inventor: Klaus Ludewigt, Hamburg (DE)

(73) Assignee: Rheinmetall Waffe Munition GmbH, Suedheide (DE)

(*) Notice: Subject to any disclaimer, the term of this patent is extended or adjusted under 35 U.S.C. 154(b) by 246 days.

(21) Appl. No.: 17/388,879

(22) Filed: Jul. 29, 2021

(65) Prior Publication Data

US 2021/0359486 A1 Nov. 18, 2021

Related U.S. Application Data

(63) Continuation of application No. PCT/EP2019/085523, filed on Dec. 17, 2019.

(30) Foreign Application Priority Data

Jan. 31, 2019 (DE) ...................... 10 2019 102 488.9

(51) Int. Cl.
*H01S 3/082* (2006.01)
*H01S 3/00* (2006.01)
*H01S 3/23* (2006.01)

(52) U.S. Cl.
CPC ............ *H01S 3/0826* (2013.01); *H01S 3/005* (2013.01); *H01S 3/2383* (2013.01)

(58) Field of Classification Search
CPC ...... H01S 3/0826; H01S 3/005; H01S 3/2383; H01S 3/0071; H01S 3/0057; H01S 3/23; G02B 27/4272; G02B 27/1086
See application file for complete search history.

(56) References Cited

U.S. PATENT DOCUMENTS 4,655,547 A 4/1987 Heritage et al.
5,127,733 A * 7/1992 Allgauer ................ G02B 6/124
356/482

(Continued)

FOREIGN PATENT DOCUMENTS

DE 102017115786 A1 1/2019
JP 2011054737 A 3/2011
WO WO2012042186 A1 4/2012

OTHER PUBLICATIONS

Japanese Office Action dated Dec. 27, 2022 in corresponding application 2021-544598.

(Continued)

*Primary Examiner* — Xinning (Tom) Niu
(74) *Attorney, Agent, or Firm* — Muncy, Geissler, Olds & Lowe, P.C.

(57) ABSTRACT

A device for combining at least two input laser beams having different spectral components. At least one pre-compensation unit for the at least two input laser beams has a diffractive optical unit which expands the input laser beam into an intermediate beam bundle in which the spectral components are spatially arranged so as to be adjacent to one another with increasing wavelength. A combination unit has at least a first diffractive optical element and a second diffractive optical element, the combination unit being aligned with the pre-compensation unit in such a way that the first diffractive optical element converts an intermediate beam bundle into a convergent beam bundle having a beam waist, the beam waist lying on the second diffractive element, and the second diffractive optical element being designed in this way that all incident spectral components are diffracted in a common radiation direction.

15 Claims, 2 Drawing Sheets

(56) References Cited

U.S. PATENT DOCUMENTS

| | | | | |
|---|---|---|---|---|
| 7,199,924 | B1* | 4/2007 | Brown | H01S 3/2383 |
| | | | | 398/87 |
| 7,262,918 | B1* | 8/2007 | Yoo | H01S 3/005 |
| | | | | 359/629 |
| 8,774,240 | B2 | 7/2014 | Cheriaux | |
| 8,797,641 | B2 | 8/2014 | Fujimoto et al. | |
| 2002/0015427 | A1* | 2/2002 | Pilgrim | H01S 5/141 |
| | | | | 372/20 |
| 2005/0205536 | A1 | 9/2005 | Norikane et al. | |
| 2007/0127123 | A1* | 6/2007 | Brown | G02B 27/144 |
| | | | | 359/556 |
| 2009/0153968 | A1* | 6/2009 | Goodno | G02B 19/0014 |
| | | | | 359/571 |
| 2009/0185590 | A1* | 7/2009 | Livingston | H01S 3/2308 |
| | | | | 372/29.023 |
| 2019/0018253 | A1 | 1/2019 | Schreiber et al. | |

OTHER PUBLICATIONS

International Search Report dated Apr. 3, 2020 in corresponding application PCT/EP2019/085523.

Madasamy et al.; "Dual-Grating Spectral Beam Combination of High-Power Fiber Lasers" IEEE Journal of selected Topics in Quantum Electronics, IEEE Service Center, Piscataway, NJ, US. vol. 15, No. 2 Mar. 1, 2009 pp. 337-343.

* cited by examiner

DEVICE FOR COMBINING AT LEAST TWO LASER BEAMS

This nonprovisional application is a continuation of International Application No. PCT/EP2019/085523, which was filed on Dec. 17, 2019 and which claims priority to German Patent Application No. 10 2019 102 488.9, which was filed in Germany on Jan. 31, 2019 and which are both herein incorporated by reference.

BACKGROUND OF THE INVENTION

Field of the Invention

The present invention relates to the problem of combining at least two input laser beams to form an effective beam with high power and high beam quality. Such techniques are used, for example, to generate high-power laser radiation, for example for the purposes of material processing.

Description of the Background Art

Various techniques are known for combining individual beams. Individual beams with different wavelengths can be combined into one output beam using the principle of spectral coupling. For this purpose, an optical coupling element can be used which has a spectrally selective effect and combines separately incident input beams with different wavelengths to form a common output beam. In particular, the wavelength-dependent diffraction of light on a diffractive optical element can be used (i.e. the wavelength dependence of the diffraction angle on the diffractive optical element). The output beam is then broadband and contains the wavelengths of the input beams as spectral components. This does not result in any disadvantages for many areas of application, in particular if the power density and/or intensity of the output beam is primarily relevant. However, the beam quality is often important for the usability of the output beam. If possible, the beam quality of the input beams should be largely retained when combined with the output beam.

Fiber lasers, for example, are laser sources which are very easy to handle. These are solid-state lasers in which the active medium is provided by an appropriately designed light-conducting fiber (e.g. doped glass fiber). Such fiber lasers can deliver laser radiation with high beam quality. In single-mode operation (in particular in basic mode), a beam quality $M^2$ of less than 1.2 can be achieved. Fiber lasers are also characterized by a long service life and an insensitive structure, as well as advantageous properties and good coolability of the active medium and the possibility of continuous operation.

For reasons of principle, laser light sources have a certain bandwidth in practice. In the case of the fiber lasers mentioned, in particular, this bandwidth is considerable and is also available in operation with the basic mode. With fiber lasers, the bandwidth of the generated radiation increases with increasing power. Various effects can contribute to this, in particular non-linear interactions in the amplifier fiber (e.g. stimulated Brillouin scattering, stimulated Raman scattering or self-phase modulation).

A non-ideal bandwidth leads to an impairment of the beam quality of the output beam in beam combination by means of spectral coupling mentioned at the outset. This is due, among other things, to the fact that a diffractive optical element provides an input beam with a bandwidth with an additional divergence due to the wavelength dependence of the scattering. In this respect, a non-zero bandwidth leads in this case to a deformed beam cross section, which, without a compensation measure, worsens the beam quality of the output beam.

SUMMARY OF THE INVENTION

It is therefore an object of the present invention to enable the generation of high-intensity laser radiation with very good beam quality by combining several input beams, wherein in particular the use of laser radiation sources with a non-ideal bandwidth should be possible and an output beam with good beam quality should still be achievable. In particular, the use of fiber lasers as input laser beam sources should also be made possible.

This problem is solved by a device for combining at least two input laser beams according to an exemplary embodiment of the invention. Each of the input laser beams has a spectral bandwidth and accordingly comprises different spectral components, each with different wavelengths. The wavelengths of the input laser beam are in this respect in a wavelength range characterized by the bandwidth. The device comprises at least one pre-compensation unit (in particular a plurality of pre-compensation units) and a combination unit arranged downstream in the beam path.

The at least one pre-compensation unit detects one or more input laser beams. The pre-compensation unit has at least one diffractive (i.e. having a bending effect) optics which expands the respective input laser beam into an assigned, widened intermediate beam bundle.

The combination unit is arranged in such a way that it detects the intermediate beam bundles fed by the input laser beams. The combination unit has at least one first diffractive optical element (DOE) and a second diffractive optical element (DOE), wherein the second diffractive optical element is arranged downstream of the first diffractive optical element in the beam path. The combination unit is matched to the at least one pre-compensation unit in such a way that the first diffractive optical element transforms an intermediate beam bundle by diffraction into a convergent beam bundle with a beam waist. In addition, the diffractive optical elements are arranged and designed in such a way that the said beam waist lies on the second diffractive optical element (i.e. is detected by the second diffractive optical element). The second diffractive optical element is then in turn designed and arranged in such a way that all incident spectral components are deflected into a common radiation direction.

In this respect, the pre-compensation unit generates a spatial beam broadening as a function of the spectral bandwidth of the respective input laser beam, wherein the individual wavelength components are arranged in a sorted manner along an expansion direction with increasing wavelength. In this respect, the intermediate beam bundle is spatially broadened in comparison to the input laser beam and the widening takes place in such a way that the spectral components are spatially sorted and that the different spectral components are spatially arranged so as to be adjacent to one another with increasing wavelength. In other words, the various spectral components in the intermediate beam bundle have a spatial beam offset as a function of the spectral distance from one another. In particular, the spectral components of the beam run next to one another in one plane, i.e. the beam is preferably expanded in such a way that the spectral components are drawn apart along the expansion direction and arranged in a sorted manner with increasing wavelength. In this respect, short-wave components tend to lie on one side of the intermediate beam bundle, and long-wave components tend to be on the other side of the intermediate beam bundle.

The combination unit is then designed and arranged in such a way that it detects the spectral components running adjacent to one another, wherein the first diffractive optical element (DOE) diffracts all the spectral components towards a common beam waist. To this extent, the beam waist is a region of convergence of the bundle of the various spectral components. With a suitable adaptation of the pre-compensation unit and the combination unit to one another, this can be achieved through the underlying diffraction effects. It is true that the different spectral components hit the first diffractive optical element (DOE) of the combination unit at different positions due to the spatial expansion in the intermediate beam bundle. However, the first diffractive optical element is then designed in particular in such a way that the wavelength-dependent deflection takes place precisely in such a way that the spectral components diffracted at the different positions converge again in the beam waist.

The second diffractive optical element (DOE) of the combination unit is then preferably aligned with the pre-compensation unit and the first diffractive optical element in such a way that the different spectral components are all diffracted in the same direction (namely the radiation direction). It is true that the different spectral components hit the second diffractive optical element of the combination unit at different angles. However, the beam waist of the convergent spectral components lies on the second diffractive optical element. As a result, all spectral components are combined again into one output beam. This takes place overall for the spectral components of the at least two input laser beams, so that all input laser beams are combined into a common output beam.

Overall, the interaction of the pre-compensation unit and the combination unit can reverse the beam broadening in accordance with the spectral bandwidth. This principle uses diffraction effects and the beam parameter product or the beam quality $M^2$ remain substantially unaffected. In particular, the output beam can have a beam quality which essentially corresponds to the beam quality of the input laser beams. In addition to the intrinsic (diffraction-limited) divergence of the laser beams, no additional beam broadening or divergence is introduced.

The invention thus enables a high-power effective beam to be fed with several input laser beams, even if these do not have an ideal bandwidth. The input laser beams can therefore be provided by fiber lasers even at high powers. The optical elements involved can be constructed in particular by means of grids (diffraction grids) and possibly plane mirrors. Such components can be manufactured with high accuracy and are also suitable for high radiation outputs in continuous operation.

The pre-compensation unit is advantageously designed and matched to the wavelength of the input laser beam in such a way that all spectral components in the intermediate beam bundle run parallel to one another along a main direction. It is true that the input laser beam and thus also each spectral component usually has an intrinsic divergence due to diffraction, which is characterized by the beam quality or the beam parameter product. The effective direction of propagation of a spectral component can, for example, be defined as an integral over all directional components of the local Poynting vectors of the various spectral components. The pre-compensation unit is preferably designed in such a way that the preferred directions of all spectral components run parallel to one another, that is to say that the intermediate beam bundle is parallelized with spatially adjacent spectral components.

The pre-compensation unit comprises in particular one or more diffractive optical elements (DOE). It is particularly advantageous if the pre-compensation unit has at least one first and one second diffractive optical element.

In particular, the first diffractive optical element can be designed such that the different spectral components of the input laser beam are diffracted in different directions such that a divergent beam bundle is formed in the beam path between the first and the second diffractive optical element. In this respect, the first diffractive optical element fans out the broadband input laser beam into its spectral components. The first diffractive optical element is designed in particular in such a way that for each spectral component a specific diffraction order (preferably first diffraction order), which is used for feeding the intermediate bundle, has a different diffraction angle.

The second diffractive optical element of the pre-compensation unit can be designed and arranged in such a way that the different spectral components of the divergent beam are all deflected or diffracted in the same direction (namely the above-mentioned main direction). Because of the divergent course in front of the second diffractive optical element, the different beam components hit the second diffractive optical element at different positions and at different angles. However, since diffraction effects are wavelength-dependent, the diffractive optical elements can be aligned with one another in such a way that the diffraction directions on the second diffractive intermediate element are the same for all spectral components. Because of the different impact position, the spectral components then run spatially offset to one another and parallel in the intermediate bundle.

The pre-compensation unit can be designed in such a way that the intermediate beam has a spatial width which is greater, the greater the bandwidth of the input laser beam. In particular, the spatial width is proportional to the bandwidth of the input laser beam, which can be achieved, for example, with diffraction on a grid in the range of small angles. In the present context, the spatial width defines the extent of the intermediate beam bundle perpendicular to the main direction (see above). The intrinsic beam divergence of the input laser beam also leads to a broadening of the beam cross section along the beam path, but this is not taken into account for the purposes of interpreting the mentioned group of features.

The diffractive optics of the pre-compensation unit or the diffractive optical elements contained therein, as well as the diffractive optical elements of the combination unit, are generally optical diffraction elements which, as a result of diffraction, generate a wavelength-dependent beam deflection. According to an advantageous embodiment, the first diffractive optical element and the second diffractive optical element of the pre-compensation unit have corresponding angular dispersions. The angular dispersion refers in particular to the dependence of the diffraction angle on the wavelength, or the change in the diffraction angle according to the wavelength. The angular dispersion indicates a measure of the wavelength splitting of a polychromatic wave by the diffractive optical element. In particular, the angular dispersion is defined as the change in the diffraction angle ($\alpha$) according to the wavelength ($\lambda$): Angular dispersion $w_d = d\alpha/d\lambda$.

The first diffractive optical element and the second diffractive optical element can be designed as reflection grids, for example. However, a configuration as a transmission grid is also conceivable. Different combinations of reflection grids and transmission grids can be advantageous here. For example, both grids can be of the same type (reflection or transmission). The use of two reflection grids enables a folded beam path and thus a small overall length or generally a small amount of space. If one of the two diffractive optical elements or both diffractive optical elements are designed as transmission grids, adjustment of the device can possibly be simplified.

When using grids, it is particularly advantageous if the first diffractive optical element and the second diffractive optical element have matching grid constants. Since the diffraction angles generally depend on the grid constant and the wavelength, diffractive optical elements with matching angular dispersion can be provided in this way.

In the pre-compensation unit, the first diffractive optical element and the second diffractive optical element are preferably aligned with respect to one another and designed in such a way that when the input laser beam is diffracted at the first diffractive optical element, the first diffraction orders of the second diffractive optical element for all spectral components of the input laser beam are detected (i.e. hit the second diffractive optical element). For this purpose, in particular the extent and the relative arrangement of the diffractive optical elements to one another are adapted to the input laser beam and its bandwidth.

The input laser beam is irradiated onto the first diffractive optical element in particular along an irradiation direction and is diffracted there. For the various spectral components, the first diffraction order in each case hits the second diffractive optical element due to the angular dispersion at different diffraction angles. The second diffractive optical element is then preferably dimensioned and aligned in such a way that it picks up the first order of diffraction of all spectral components and diffracts it into the intermediate beam bundle.

The first and second diffractive optical elements of the combination unit can also be aligned and designed in relation to one another in such a way that when the intermediate bundle is diffracted at the first diffractive optical element, the first diffraction order for all spectral components is detected by the second diffractive optical element of the combination unit. As a result, the diffraction angles of the various diffractive optical elements are automatically matched to one another in such a way that the pre-compensated and expanded beam (intermediate beam bundle) is automatically merged again into a beam with high beam quality and a small beam cross section.

The diffractive optical elements of the pre-compensation unit and the combination unit can have matching dispersion properties, in particular have matching angular dispersions. In this respect, it is advantageous if all diffractive optical elements of the device have matching dispersion properties. This can be achieved, for example, in that the grids of the pre-compensation unit and the combination unit have the same grid constants. This example has the advantage, for example, that the expansion of the beam by the pre-compensation unit with the combination unit is easily reversed. In this respect, the device can then be used for different bandwidths without special adaptations having to be made. Overall, this results in a symmetrical structure.

However, it can also be advantageous if the diffractive optical elements of the pre-compensation unit and the diffractive optical elements of the combination unit have angular dispersions that differ from one another. In particular, the pre-compensation unit (in particular in the beam path after the second diffractive optical element) and/or the combination unit (in particular in the beam path in front of the first diffractive optical element) comprises adaptation optics. The adaptation optics are designed in particular to change convergence properties and/or divergence properties and/or a beam width. In such configurations it is possible to use non-matching optical grids and to carry out the required optical adjustments (spreading or convergence of the bundle) by means of lenses and/or mirrors. For example, the adaptation optics can comprise one or more planar deflecting mirrors. It is also conceivable that the adaptation optics have a telescope with at least two lenses. The telescope can, for example, be designed as an anamorphic telescope, for example to generate an inhomogeneous beam expansion or to adapt the beam expansion after the pre-compensation unit to the properties of the combination unit.

The device can comprise several pre-compensation units, each with a diffractive optical system. A pre-compensation unit can be assigned to each input laser beam. This makes it possible to feed the output beam with a plurality of possibly broadband input laser beams.

However, it can also be advantageous for a pre-compensation unit to be effective for several input laser beams. This enables a compact structure. For a further refinement, the plurality of pre-compensation units are designed and arranged in such a way that the intermediate beam bundles generated by the various pre-compensation units all run parallel to one another. In this respect, the main directions defined above are preferably parallel to one another. In this way, the various intermediate beam bundles can all be fed into the combination unit parallel to one another.

The invention also relates to a device for generating a laser beam (for example, the above-mentioned output beam), comprising at least two input laser sources for each outputting an input laser beam, as well as comprising a device for combining the input laser beams in the way described herein. In these examples, separate laser branches are thereby combined to form the output beam.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
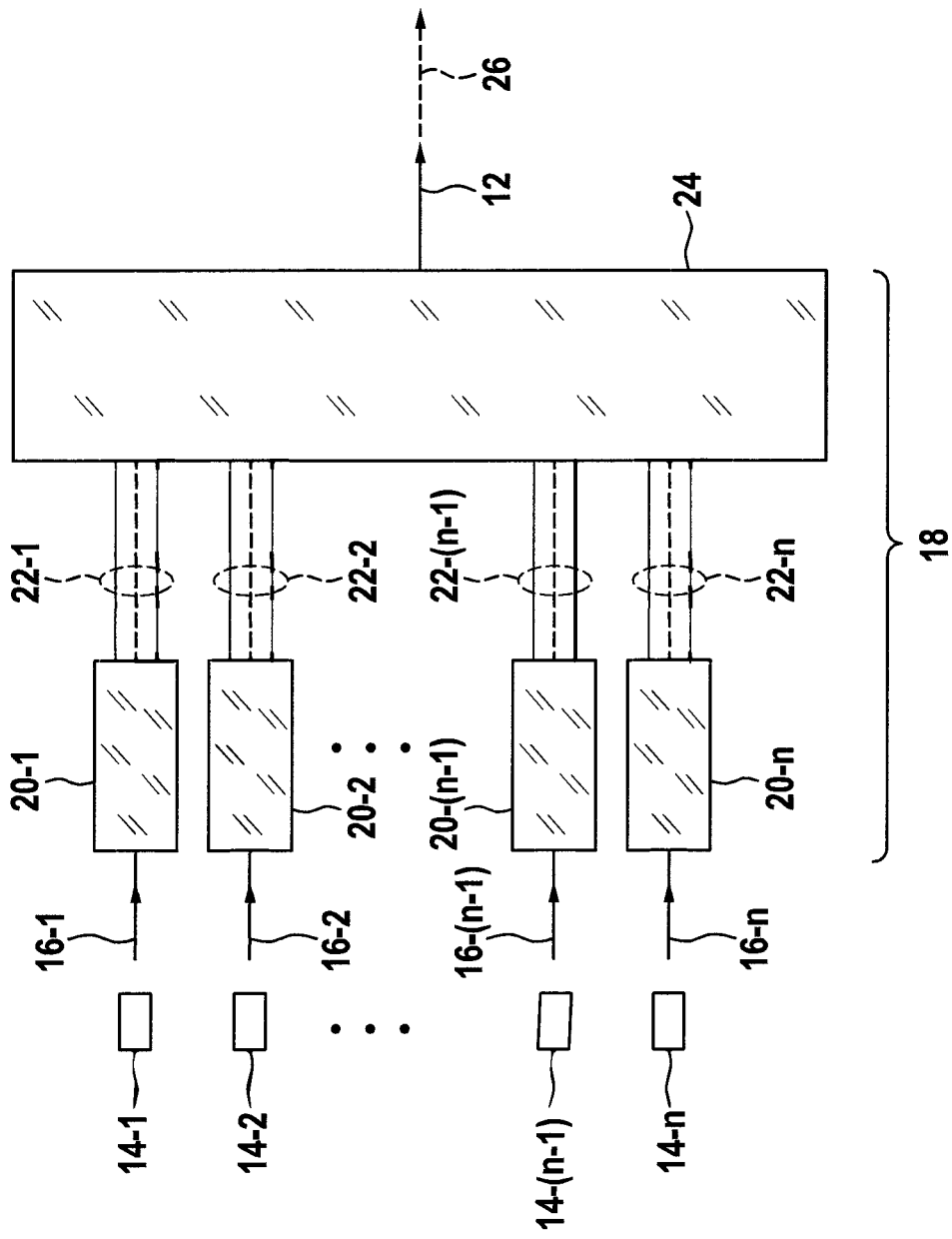
FIG. 1 is a sketched representation of a device for combining a plurality of broadband input laser beams, comprising pre-compensation units (sketched representation) and a combination unit (sketched representation)

FIG. 1 shows a device, denoted in its entirety by reference numeral 10, for generating a particularly high-energy laser beam (output beam 12) in a sketched illustration. The device 10 comprises a plurality n of input laser sources 14-1, 14-2, ... 14-n–1, 14-n, which each emit an input laser beam 16-1, 16-2, ....

Each input laser beam 16-1, 16-2, ... has a certain spectral bandwidth and in this respect comprises different spectral components having different wavelengths A. The device 10 serves in particular for the purpose of providing a high-energy output beam 12 with a beam quality $M^2$ that is as similar as possible to or corresponding to the beam quality $M^2$ of the individual input laser sources 14-1, 14-2, .... The input laser sources 14 can be designed as fiber lasers, for example, which are operated in their basic mode in particular for radiation and accordingly have a high beam quality. The respective input laser beams 16-1, 16-2, ... always have a certain intrinsic divergence due to diffraction, which naturally leads to a beam broadening when propagating over longer distances. For the purpose of explaining the present invention, however, this effect will be neglected in the present description.

The radiation from the input laser sources 14-1, ..., 14-n enters into a device 18 for combining several input laser beams 16-1, 16-2, .... The device 18 is explained in more detail below.

The device for combining the input laser beams 16-1, 16-2, ... comprises, in the example shown, a plurality of pre-compensation units 20-1, 20-2, ..., 20-n, wherein one of the pre-compensation units 20 is assigned to an input laser beam 16 in the example shown and only the respectively assigned input laser beam 16 is detected. However, this configuration is not mandatory; it is also conceivable that a pre-compensation unit 20 detects a plurality of input laser beams 16.

As will be explained in detail below, each pre-compensation unit 20-1, 20-2, ... transforms the detected input laser beam 16-1, 16-2, ... into a respectively assigned, broadened intermediate beam bundle 22-1, 22-2, .... In the intermediate beam bundle 22, the spectral components of the respectively assigned input laser beam 16 are no longer superimposed in a common beam, but rather spatially arranged so as to be adjacent to one another with increasing wavelength (see below).

The intermediate beam bundles 22-1, 22-2, ... then run into a combination unit 24—possibly via additional adaptation optics (see below). The combination unit 24 brings the intermediate beam bundles 22-1, 22-2, ... together in the manner described in more detail below, so that they run in a common radiation direction 26 and form the output beam 12. In the output beam 12, the radiation powers of the input laser beams 16-1, 16-2, ... are combined and the output beam 12, like the input laser beams 16, is broadband (i.e. has a spectral bandwidth that includes all spectral bandwidths of the input laser beams 16).

Figure 2:
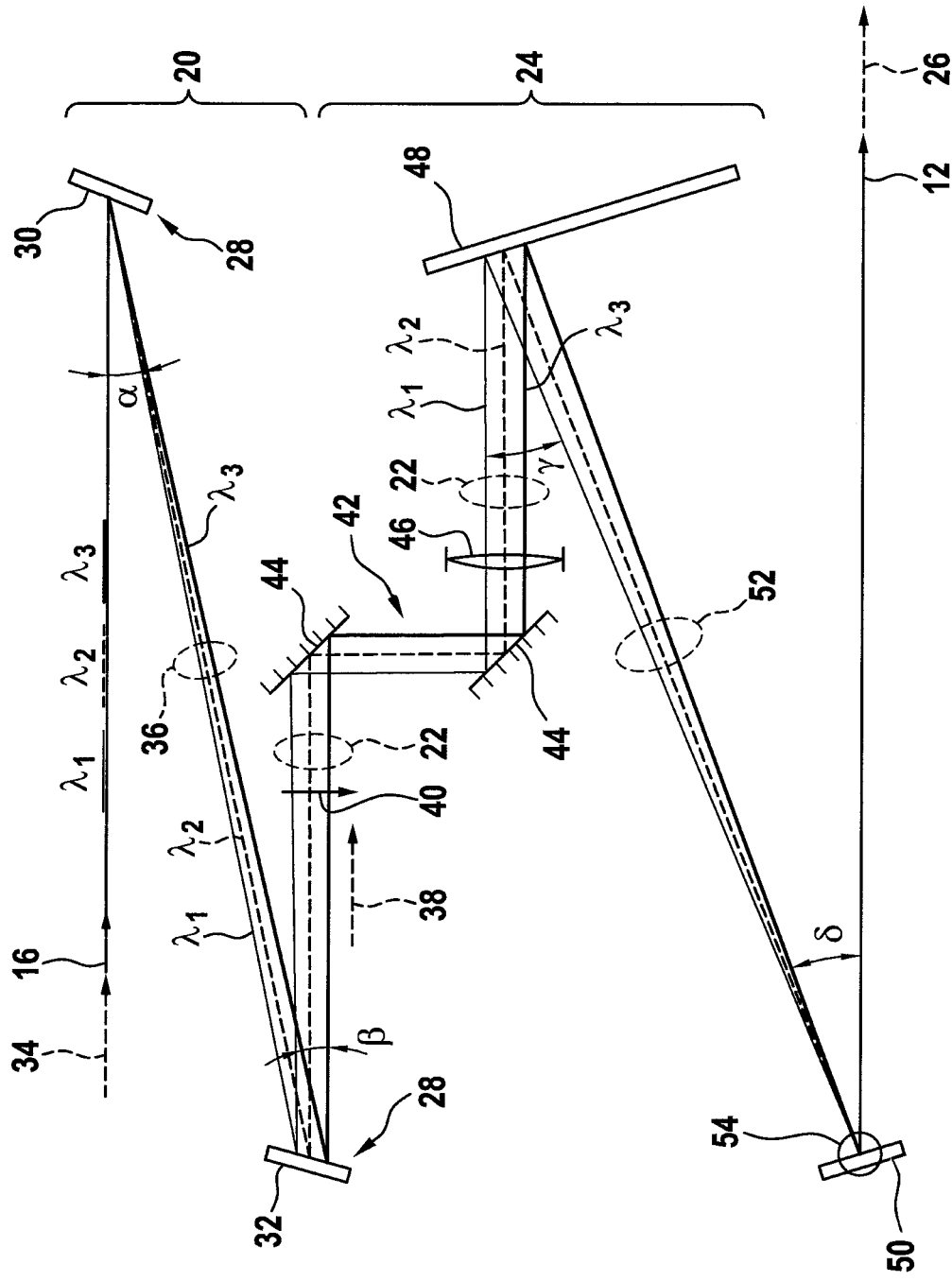
FIG. 2 is a sketched representation of a device with a pre-compensation unit and a combination unit.

FIG. 2 shows a sketched illustration to explain an example of the device 18. For the sake of clarity, however, only one pre-compensation unit 20 is sketched in FIG. 2 as well as a combination unit 24 arranged downstream of the pre-compensation unit 20 in the beam path.

The pre-compensation unit 20 has a diffractive optics 28, which in the example shown comprises two diffractive optical elements (DOE), namely a first diffractive optical element 30 and a second diffractive optical element 32 following in the beam path. The diffractive optical elements 30, 32 can be designed as diffraction grids, for example. In the example shown, both diffractive optical elements act in reflection, in particular reflection grids are involved.

The diffractive optical elements 30, 32 are characterized by a respective assigned angular dispersion w. The angular dispersion reflects the change in a diffraction angle $\alpha$ or $\beta$ for an input laser beam 16 as a function of its wavelength $\lambda$. In this respect, the angular dispersion of the first diffractive optical element 30 can be defined as $w=d\alpha/d\lambda$. Correspondingly, the angular dispersion of the second diffractive optical element 32 is defined as $w=d\beta/d\lambda$.

Before it hits the first diffractive optical element 30, the input laser beam 16 propagates along an irradiation direction 34 and, in the example discussed, has a high beam quality $M^2$ (intrinsic, diffraction-related divergences are not taken into account in the present example, as explained above). The input laser beam 16 is broadband and comprises spectral components, of which three wavelengths $\lambda_1$, $\lambda_2$, $\lambda_3$ are indicated in FIG. 2 by way of example.

The input laser beam 16 hits the first diffractive optical element 30 with its spectral components (wavelengths $\lambda_1$, $\lambda_2$, $\lambda_3$) along the irradiation direction 34. Due to the angular dispersion, the different spectral components with wavelengths ($\lambda_1$, $\lambda_2$, $\lambda_3$) are diffracted differently at the first diffractive optical element 30. In the following, the first order of diffraction is considered as an example, into which a large part of the radiation intensity is supposed to pass in the example shown. With respect to the irradiation direction 34, the spectral components with wavelengths $\lambda_1$, $\lambda_2$, $\lambda_3$ are thus diffracted at different diffraction angles $\alpha(\lambda)$. The first diffractive optical element therefore converts the input laser beam 16 into a divergent beam bundle 36 by means of diffraction. In the divergent beam bundle 36, the spectral components with the wavelengths ($\lambda_1$, $\lambda_2$, $\lambda_3$) therefore no longer coincide in a single laser beam, but are spatially fanned out. Spectral components with a small wavelength lie on one side of the divergent beam 36 and spectral components with a large wavelength lie on the opposite side of the divergent beam 36.

The first diffractive optical element 30 and the second diffractive optical element 32 are arranged in relation to one another and designed such that the spectral components with wavelengths $\lambda_1$, $\lambda_2$, $\lambda_3$ are detected by the second diffractive optical element 32. Due to the fanning out in the divergent beam bundle 36, the different spectral components strike the second diffractive optical element 32 on the one hand at different positions and on the other hand at different angles of incidence (for example measured relative to a surface normal on a surface of the second diffractive optical element 32).

The second diffractive optical element 32 is now designed in such a way that the various spectral components with wavelengths $\lambda_1$, $\lambda_2$, $\lambda_3$ after diffraction at the second diffractive optical element 32 all run parallel to one another in a main direction 38. After diffraction at the second diffractive optical element 32, the spectral components thus form the intermediate beam bundle 22 in which the various spectral components with wavelengths $\lambda_1$, $\lambda_2$, $\lambda_3$ are spatially drawn apart and run parallel to one another. In the intermediate beam bundle 22, in the example shown, the various spectral components are sorted adjacent one another along an expansion direction 40 with increasing wavelength.

The parallel course of the various spectral components in the intermediate beam bundle 22 can be achieved, for example, in that the angular dispersion $d\alpha/d\lambda$ of the first diffractive optical element 30 is the same as the angular dispersion $d\beta/d\lambda$ of the second diffractive optical element 32. The intermediate beam bundle 22 then has, in particular along the expansion direction 40, a width which (in the region of small angles) is essentially proportional to the spectral bandwidth of the input laser beam 16.

In the example shown, the intermediate beam bundle 22 passes through an adaptation optics 42 in the beam path after the second diffractive optical element 32, which (only by way of example) can have one or more deflecting mirrors 44 (e.g. plane mirrors) and/or one or more lenses 46 for shaping beam properties.

The intermediate beam 22 is then detected by the combination unit 24. The combination unit 24 serves to combine the majority of the intermediate beam bundles 22 (cf. FIG. 1) to form the common output beam 12. The combination unit 24 is coordinated with the pre-compensation unit 20 in such a way that the expanded intermediate beam bundles 22 are not only combined with one another, but the beam quality of the input laser beams is largely retained in the output beam 12. In FIG. 2, the mode of operation of the combination unit 24 is explained using only one intermediate beam as an example.

The combination unit 24 in turn comprises a first diffractive optical element 48 and a second diffractive optical element 50 following in the beam path. Corresponding to the diffractive optical elements 30, 32 of the pre-compensation unit 20, the diffractive optical elements 48, 50 of the combination unit 24 are characterized by an angular dispersion. In the example shown, $\gamma$ designates the diffraction angle on the first diffractive optical element 48 and $\varphi$ the diffraction angle on the second diffractive optical element 50. Correspondingly, the angular dispersions $w=d\gamma/d\lambda$ and $w=d\delta/d\lambda$ are defined by the first diffractive optical element 48 and the second diffractive optical element 50, respectively.

The first diffractive optical element 48 of the combination unit 24 is designed such that the spectral components with the different wavelengths ($\lambda_1, \lambda_2, \lambda_3$) are converted into a convergent beam bundle 52 by diffraction, which forms a beam waist 54. Since the spectral components with wavelengths ($\lambda_1, \lambda_2, \lambda_3$) of the intermediate beam bundle 22 hit the first diffractive optical element 48 at different positions, the desired convergent beam bundle 52 can be achieved by suitable alignment of the angular dispersion of the first diffractive optical element 48. In particular, for this purpose the angular dispersion of the first diffractive optical element 48 can be selected to match the angular dispersions of the diffractive optical elements 30, 32 of the pre-compensation unit 20.

The second diffractive optical element 50 of the combination unit 24 is designed and positioned in such a way that the beam waist 54 lies substantially on an effective surface of the second diffractive optical element 50. The second diffractive optical element 50 is then designed such that the spectral components (wavelengths $\lambda_1, \lambda_2, \lambda_3$) incident at different angles are all diffracted in the radiation direction 26 and are thus combined to form the output beam 12.

For example, this can in turn be achieved in that the angular dispersion of the second diffractive optical element is selected to match the angular dispersions of the diffractive optical elements 30, 32 of the pre-compensation unit 30 and the angular dispersion of the first diffractive optical element 48 of the combination unit 24.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A device for combining at least two input laser beams, the input laser beams each having a spectral bandwidth and comprising different spectral components each with different wavelengths, the device comprising:
at least one pre-compensation unit for the at least two input laser beams, wherein the pre-compensation unit has at least one diffractive optic which expands each of the input laser beams into a respectively assigned intermediate beam bundle in which the spectral components are spatially arranged so as to be adjacent to one another with increasing wavelength, such that at least two intermediate beam bundles are provided;
a combination unit for the at least two intermediate beam bundles, the combination unit comprising at least a first diffractive optical element and a second diffractive optical element arranged downstream in the beam path, and the combination unit being aligned with the pre-compensation unit such that the first diffractive optical element converts each intermediate beam bundle into a convergent beam bundle having a beam waist, the beam waist lying on the second diffractive optical element, and the second diffractive optical element being designed such that all incident spectral components are diffracted in a common radiation direction,
wherein the pre-compensation unit has at least one first diffractive optical element and has, downstream in the beam path, a second diffractive optical element, and
wherein the pre-compensation unit and/or the combination unit comprise adaptation optics for changing convergence properties and/or divergence properties and/or a beam width.

2. The device according to claim I, wherein the pre-compensation unit is designed such that all spectral components in the intermediate beam run parallel to one another.

3. The device according to claim 1, wherein the first diffractive optical element of the pre-compensation unit is designed and arranged such that the different spectral components of the input laser beam are bent in different directions and in the beam path to form a divergent beam bundle between the first diffractive optical element and the second diffractive optical element of the pre-compensation unit.

4. The device according to claim 3, wherein the second diffractive optical element of the pre-compensation unit is designed and arranged such that the different spectral components of the divergent beam bundle are all diffracted in the same direction.

5. The device according to claim 1, wherein the pre-compensation unit is designed such that the intermediate beam bundle has a spatial width which is greater, the greater the bandwidth of the input laser beam.

6. The device according to claim 1, wherein the first diffractive optical element and the second diffractive optical element of the pre-compensation unit have a corresponding angular dispersion.

7. The device according to claim 1, wherein the first diffractive optical element and the second diffractive optical element of the pre-compensation unit are designed as reflection grids or as transmission grids.

8. The device according to claim 7, wherein the first diffractive optical element and the second diffractive optical element of the pre-compensation unit are characterized by matching grid constants.

9. The device according to claim 1, wherein the first diffractive optical element and the second diffractive optical element of the pre-compensation unit are designed and arranged such that upon diffraction of the input laser beam at the first diffractive optical element, a first diffraction order of the spectral components of the input laser beam is detected by the second diffractive optical element.

10. The device according to claim 1, wherein the first and second diffractive optical elements of the pre-compensation unit and the first and second diffractive optical elements of the combination unit have a corresponding angular dispersion.

11. The device according to claim 1, wherein the first and second diffractive optical elements of the pre-compensation unit and the first and second diffractive optical elements of the combination unit have angular dispersions that differ from one another.

12. The device according to claim 1, wherein the adaptation optics has at least one planar, deflecting mirror.

13. The device according to claim 1, wherein the adaptation optics has at least one telescope with at least two lenses.

14. The device according to claim 1, further comprising a plurality of the pre-compensation unit each having the diffractive optic, such that each input laser beam has an associated pre-compensation unit.

15. The device according to claim 14, wherein the plurality of pre-compensation units are arranged such that the intermediate beam bundles created by each of the pre-compensation units run parallel to each other.

\* \* \* \* \*